J. KELLINGTON.
FISH SALTING AND DESLIMING MACHINE.
APPLICATION FILED SEPT. 28, 1918.
1,310,662. Patented July 22, 1919.
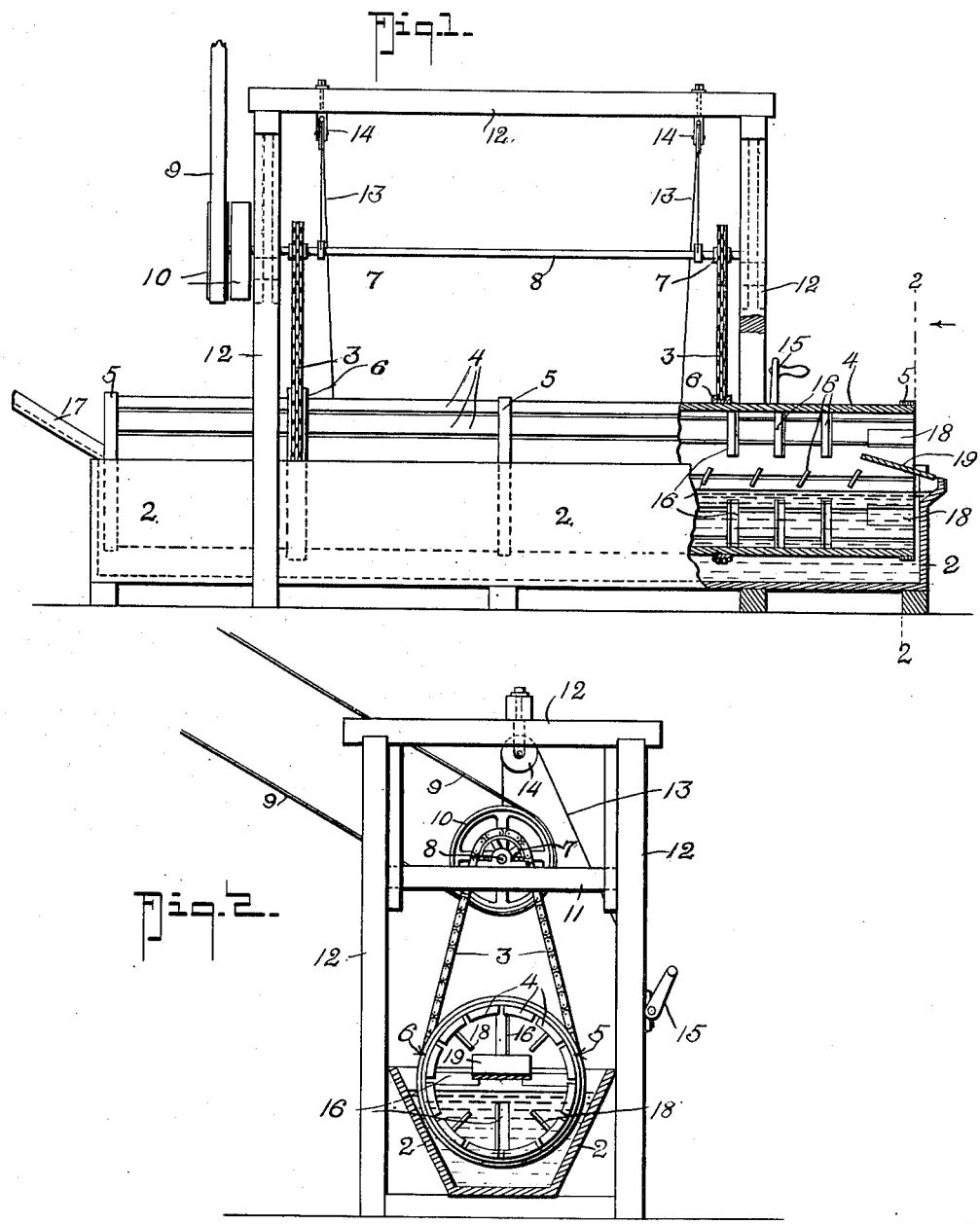
INVENTOR
John Kellington
BY
Fred J. Dieterich & Co.
ATTORNEYS

UNITED STATES PATENT OFFICE.

JOHN KELLINGTON, OF NEW WESTMINSTER, BRITISH COLUMBIA, CANADA.

FISH SALTING AND DESLIMING MACHINE.

1,310,662. Specification of Letters Patent. Patented July 22, 1919.

Application filed September 28, 1918. Serial No. 256,068.

*To all whom it may concern:*

Be it known that I, JOHN KELLINGTON, a citizen of the Dominion of Canada, residing at New Westminster, in the Province of British Columbia, Canada, have invented certain new and useful Improvements in Fish Salting and Desliming Machines, of which the following is a specification.

This invention relates to a device for salting and de-sliming fish preparatory to packing the same into cans for cooking.

At present the fish, after being trimmed and cleaned and cut into suitable lengths for packing into the cans, is put into brine tubs where it is left for a sufficient time to become impregnated with the salt and supposedly to have the slime removed. The fish, however, is left for no measured time in the brine and beyond an occasional stirring no consistent attempt is made to clean the slime from the fish and the proceeding is generally considered by canners as insanitary and unsatisfactory.

In the de-slimer, which is the subject of this application, the fish is conveyed for a definite time through the brine and during such conveyance is tumbled about in it in a manner that effectually cleans the slime from the fish and after the required exposure to this treatment, the fish is automatically delivered from the brine tank to be packed into cans.

The invention is particularly described in the following specification, reference being made to the drawings by which it is accompanied, in which:

Figure 1 is a side elevation and part longitudinal section.

Fig. 2 is a cross section and end elevation on the line 2—2 in Fig. 1.

The device comprises an elongated brine tank 2 having closed ends within which tank is suspended in chains 3 an open-ended hollow cylinder composed of staves 4 secured to hoops 5 with spaces between the staves that will permit free passage of the pickling brine through the wall of the cylinder. The endless chains 3 by which the cylinder is suspended and rotated are carried around the cylinder on flanged hoops 6 and pass over sprocket wheels 7 secured on a shaft 8 extending lengthwise over the middle line of the tank. This shaft 8 is driven by any suitable means and is here shown as driven by a belt 9 taking over a pulley 10.

The shaft 8 is mounted in a frame 11 which is slidably mounted in an outer frame 12 to be raised and lowered therein by lines 13 connected to a ring at each end of the shaft 8, which lines pass over sheaves 14 in the upper part of the frame 12 and are carried down and secured to a shaft 15 rotatably mounted on the side of the same frame and operated by a crank handle.

From the inner side of the hollow cylinder blades 16 radially project toward the center, which blades are angled slightly to progress the contents of the cylinder slowly from the admission to the delivery end.

The fish being delivered to within one end of the cylinder by a chute 17 is, by rotation of the cylinder and by the angle of the blades 16, progressed slowly to the opposite end, within which end there are radial shelves 18 which are inclined slightly from the plane of the axis of rotation. On these shelves the sections of cut fish are lifted from the brine and fall upon a chute 19 which is projected a short distance within this end of the cylinder and is downwardly inclined outward over the end of the tank to deliver the fish to the can packers.

It will be noted that the fish is with reasonable uniformity of time progressed by the blades 16 along the brine tank and by rotation of the cylinder is rolled against the sides of the staves 4, by which blade stirring and rolling contact the slime "cut" by the brine is washed off and the continuous movement of the fish through the brine also serves to better impregnate it with the salt. The result is a greater uniformity in the salting of the fish and a greater cleanliness in the product.

Having now particularly described my invention, I hereby declare that what I claim as new and desire to be protected in by Letters Patent, is:

A means for salting and de-sliming fish comprising in combination with an elongated brine holding tank, an open ended drum or cylinder rotatably suspended within the tank, a supporting frame extending above the tank, cross bars vertically movably mounted in said frame, a driving shaft journaled in bearings in said cross bars, sprockets on said driving shaft, chain guides on said cylinder, chains taking around said sprockets and chain guides to suspend said cylinder in said tank and impart rotation thereto, means for delivering the fish to be treated within one end of said cylinder, means for progressing the fish along the cylinder to the other end, means at said other end of the cylinder for lifting the fish from the brine and an inclined chute onto which the fish are deposited when lifted from the brine for delivery from the tank, and means for raising and lowering the driving shaft and the rotatable cylinder as a unit to increase or diminish the dip of the cylinder into the brine of the tank substantially as shown and described.

In testimony whereof I affix my signature.

JOHN KELLINGTON.